3,114,985
ANIMAL TRAP
George Killinger, Elwood, Ill.
Filed Apr. 4, 1961, Ser. No. 100,617
4 Claims. (Cl. 43—83.5)

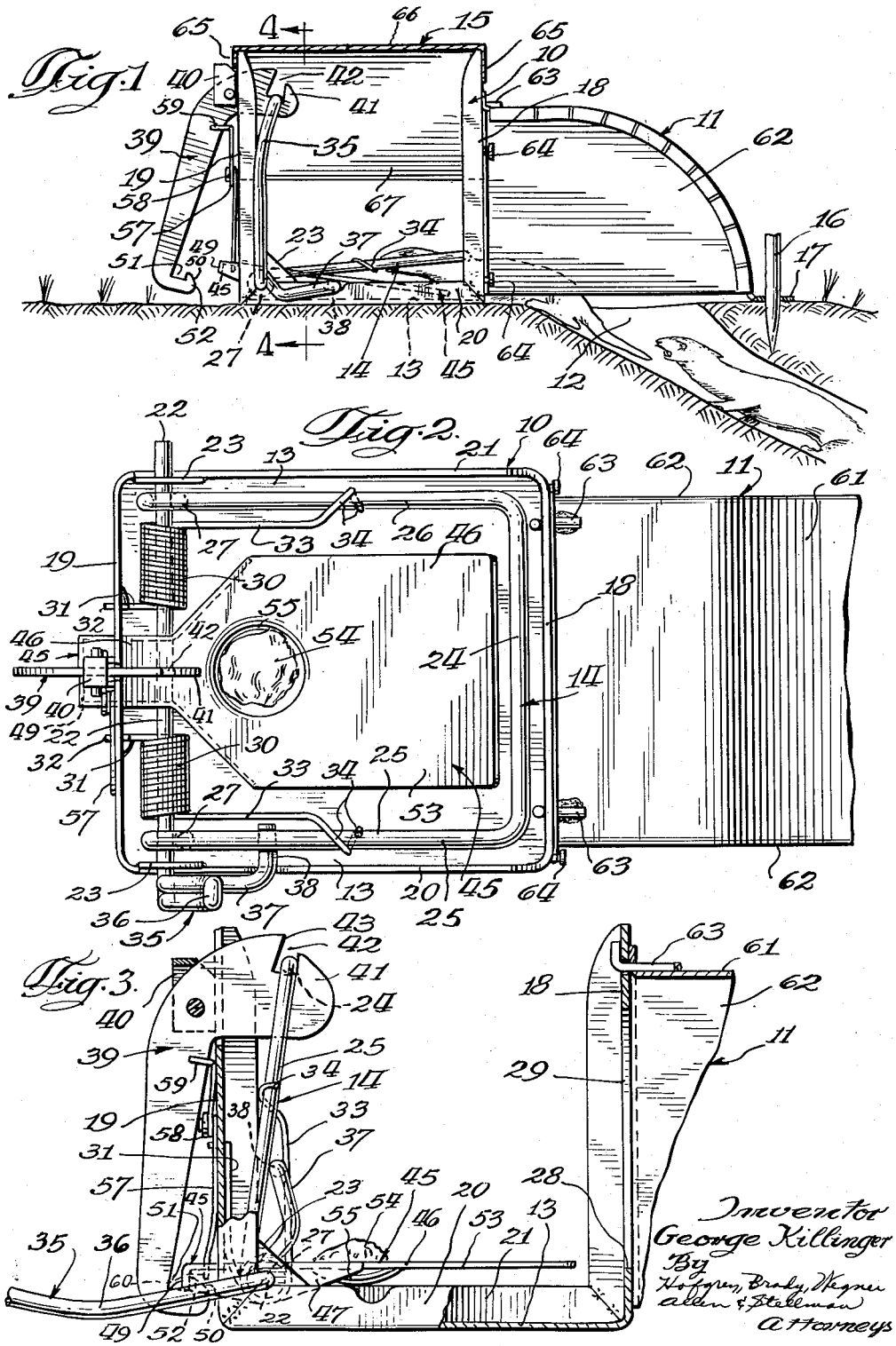

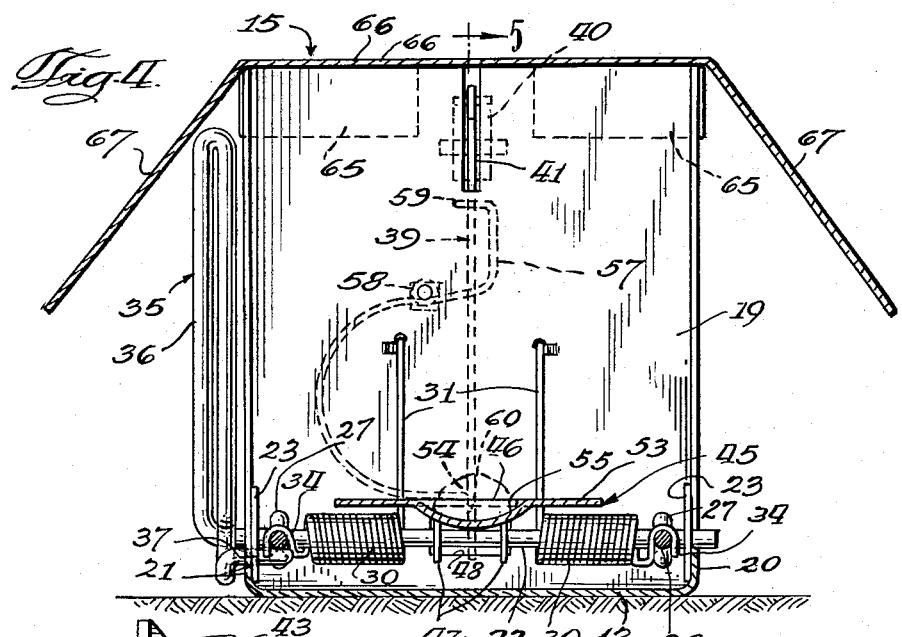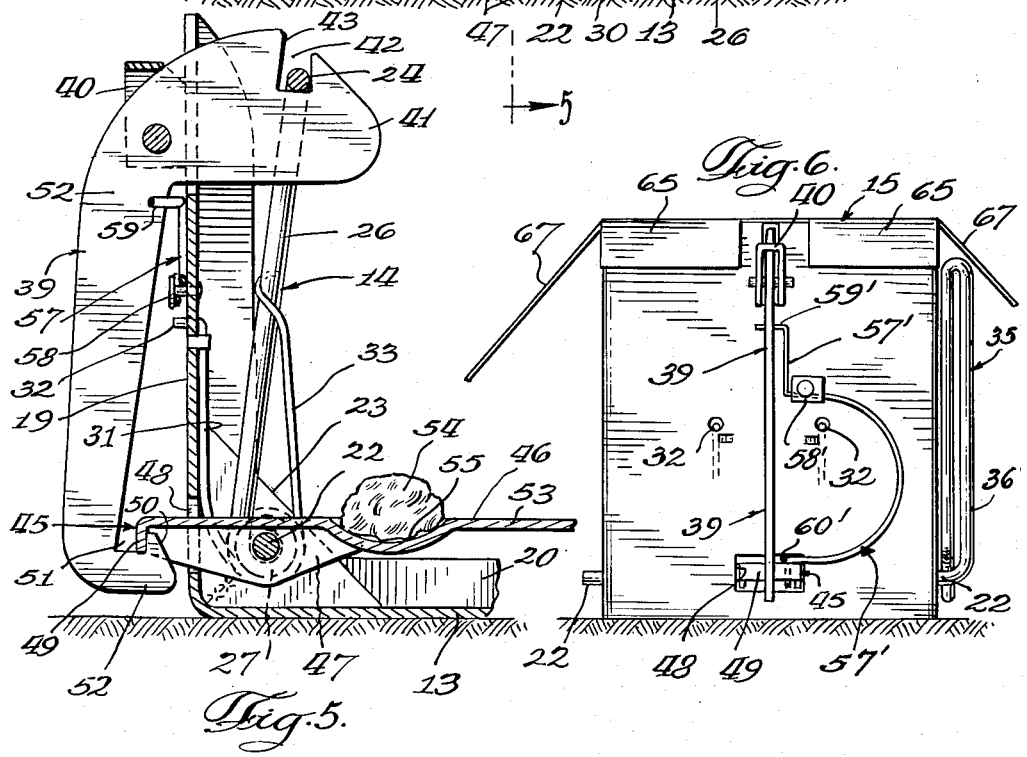

This invention relates to an animal trap.

A primary object of this invention is to provide a new and improved animal trap.

Another object of this invention is to provide a new and improved animal trap for catching certain animals while protecting other animals for entanglement in the trap.

Still another object is to provide a new and improved animal trap having a mechanism, separate from the animal contacting portions of the trap, for setting or cocking the trap.

A further object is to provide a new and improved animal trap having a frame for protecting larger animals from entanglement in the trap while facilitating ingress of smaller animals and for retarding the entrance of foreign particles which might jam the trap.

A still further object of this invention is to provide a new and improved animal trap which is rugged and durable as well as convenient to use and sensitive to ingress by an animal.

Other objects, features and advantages of the present invention will be apparent from the following description of a preferred embodiment illustrated in the accompanying drawings, in which:

FIGURE 1 is a side elevational view of an animal trap embodying the invention and operatively positioned in a release position over a ground opening to an animal's hole, with portions broken away for clearer illustrations;

FIGURE 2 is an enlarged, fragmentary plan view of the animal trap of FIGURE 1, with parts broken away and removed for clearer illustration;

FIGURE 3 is an enlarged, fragmentary side elevational view of the trap in a cocked position, with parts broken away and removed for clearer illustration;

FIGURE 4 is a further enlarged sectional view taken generally along the line 4—4 of FIGURE 1;

FIGURE 5 is a fragmentary vertical sectional view taken generally along the line 5—5 of FIGURE 4, with parts removed for clearer illustration; and, FIGURE 6 is a slightly enlarged rear end elevational view of a modified animal trap.

The present invention is, in brief, directed to an animal trap having a rigid frame for retarding entanglement of larger animals in the trap while facilitating easy ingress and trapping of smaller animals, such as mice, rats, moles or ground squirrels, as well as retarding the entrance of foreign particles which might jam the trap. A lever is provided so that the trap may be easily set or cocked from outside the frame without touching the animal engaging portions of the trap. When the trap is cocked a sensitive trigger mechanism holds a latch which in turn holds a spring pressed bail in the cocked position. As an animal contacts the trigger, the bail is released and is slammed against the animal by a spring assembly. A cover is removably received on an open top of the rigid frame for further preventing entanglement of larger animals as by stepping on the trigger. Also, a hood may be detachably secured to the frame and positioned over a ground opening to an animal's hole, for directing the emerging animal into the trap.

In the preferred embodiment of the invention illustrated in the drawings, and with particular reference to FIGURE 1, the animal trap has a rigid frame 10 operatively positioned on the ground. Detachably secured to the frame is a hood 11 with an open bottom positioned over an opening 12 to an animal's hole for directing an animal into the trap. In FIGURE 1 the trap is in the released position with an animal trapped between a base 13 of the frame 10 and a spring pressed jaw in the form of a stiff wire bail 14. A protective cover 15 is detachably secured across an upper open end of the frame 10 to retard entanglement of larger animals in the trap and to protect the interior of the trap from weather. If desired, the trap may be anchored to the ground as by pegs 16 impaled in the ground through suitable holds, such as in an outwardly extending flange 17 of the hood.

Referring to the drawings generally, an upstanding encircling flange extends upwardly from front and rear ends and opposite sides of the frame base 13 for retarding the entrance of foreign particles into the trap and possible jamming of the trap, and for providing a more rigid and stronger frame. This flange includes an upstanding portion in the form of a front end flange 18 and another upstanding portion in the form of a rear end flange 19 both of substantially the same height and higher than opposed side flanges 20 and 21 which are low to provide open sides of the frame for ingress of an animal. Short flanges extending inwardly from side edges of the front and rear flanges further strengthen the frame.

A hinge pin 22 is parallel and adjacent to the juncture between the base 13 and the rear flange 19 and has opposite ends pivotally mounted on the frame 10, and more particularly in holes in fillets 23 between the rear flange 19 and the side flanges 20 and 21.

Animal trapping jaw 14, which has previously been described as a stiff wire bail, has a bight portion 24 and opposite arms 25 and 26 each with a free end in the form of an eye 27 loosely telescoped on hinge pin 22 inwardly of an adjacent fillet 23. Thus the bail is mounted for pivotal movement about a substantially horizontal axis between a cocked position shown best in FIGURES 3 and 5, in which the bail is generally parallel and adjacent the upright rear flange 19; and a released position shown best in FIGURES 1 and 2, in which the bail is generally parallel and adjacent the frame base 13.

In the released position bight 24 of the bail is slightly spaced from the front flange 18, and more particularly from the bottom edge 28 of a large opening 29 in the front flange 18 for the passage of a small animal into the trap. It should be noted that the bottom edge 28 of the opening is spaced from the base 13 of the trap to retard the entrance of foreign particles into the trap, as previously discussed. Similarly, bail arms 25 and 26 are each slightly spaced from their adjacent side flanges 20 and 21, respectively. Thus the bail cooperates with the adjacent upper edges of side flanges 20 and 21 and bottom edge 28 of the opening 29 to tightly clamp and instantaneously kill an animal entering the trap.

To further assure effectively catching and instantaneously killing an animal entering the trap, the bail 14 is resiliently urged from the cocked position, as shown in FIGURES 3 and 5, to the released position, as shown in FIGURE 1, by a pair of strong spiral torsion springs 30 each loosely telescoped on the hinge pin 22 and slightly spaced inwardly of the adjacent bail eyes 27. Inner ends 31 of these springs are seated against the rear flange 19 and may have transverse fingers 32 extending through holes in the rear flange 19 for holding the spring against inward movement on the hinge pin. Outer spring ends 33 are each interlocked with an adjacent bail arm by a loop portion 34 extending over the respective bail arm at a point spaced from the hinge pin 22. The springs 30 are operatively assembled in the trap under substantial torsion stress and as the bail 14 is moved from its released position to its cocked position the springs are further tensioned to rapidly drive the bail from the cocked to the released position with a powerful force.

In order to cock the trap without touching the animal engaging portions of the trap, such as bail 14 and the lower portions of frame 10, a cocking lever 35 is provided. Cocking lever 35 is integral with an outer end of the hinge pin 22 and has a manual operating arm 36 in the form of a U-shaped member having one end integral with the hinge pin 22 and the opposite end integral with a transverse bail actuating arm 37. A transverse finger 38 freely engages the bail arm 25 at a point spaced from the hinge pin 22. With the bail 14 released the manual operating arm 36 is in its normal position generally parallel to the rear flange 19. As the manual operating arm 36 is rotated counterclockwise, as seen in FIGURE 1, actuating arm 37 pivots bail 14 counterclockwise to its cocked position adjacent rear flange 19, as illustrated in FIGURE 3. Cocking lever 35 may now be freely rotated back to its normal position so as not to move with the bail when the trap is released.

For releasably retaining bail 14 in its cocked position, a latch 39 is mounted on a bracket 40 secured to an upper portion of the outer face of rear flange 19 for pivotal movement of the latch about a horizontal axis between a cocked position as illustrated in FIGURE 3, and a releasing position as illustrated in FIGURE 1. A bail latch portion 41 of the latch 39 extends inwardly from the pivot pin through an upright slot in the rear flange 19. Portion 41 has a slot or notch 42 with an upwardly and inwardly inclined rear surface 43 engaged by the bail bight 24 as the bail is moved into the cocked position to pivot the latch 39 from its releasing position to its cocked position with the bight 24 held in the notch 42.

Retention of the latch 39 in its cocked position is provided by a trigger 45 having a body 46 with depending flanges 47 having aligned holes loosely received on hinge pin 22 and mounting the trigger for pivotal movement about a horizontal axis between a cocked position as shown in FIGURE 3, and a releasing position as shown in FIGURE 1. Body 46 extends outwardly from the hinge pin 22 through a slot 48 in the rear flange 19 and has a depending end flange 49 providing a holding portion which rides over an inclined surface 50 on the lower end of latch 39 and is received in a hook or notch 51 in a trigger latch portion 52 of the latch 39.

The inner end of the trigger body 46 is in the form of a pan or pressure plate 53 for receiving bait 54 in a bait holding depression 55. When the trap is cocked and as an animal approaches the bait 54, either through the opening 29 in the front upright flange 18 or through the open sides of the frame 10, the slightest weight of the animal on the pressure plate 53 pivots the trigger to the releasing position shown in FIGURE 1, disengaging the holding portion 49 of the trigger from the trigger latch portion 52 so that the latch is pivoted by the bail 14 as the spiral torsion springs 30 urge the bail 14 toward base 13. Thus, the animal is snared between the bail and one of the top edges of frame side flanges 20 or 21, or the bottom edge 28 of opening 29, thereby instantaneously killing the animal.

To release the animal from the trap, manual operating arm 36 is rotated counterclockwise, from the position shown in FIGURE 1 to the position shown in FIGURE 3, while holding the front end of the trap against the ground with a hand pressing downwardly on the top edges of the upstanding rear flange 19 and front flange 18. As previously mentioned, after the bail has been returned to its cocked position the cocking lever 35 may be pivoted back to its normal position generally parallel to the rear upright flange 19. If desired the bail may be gently returned to its released position by the cocking lever.

For easier cocking of a released trap the latch 39 is maintained in its released position and the trigger is maintained in its cocked position by a positioning spring 57 which may be a simple spring wire of any suitable configuration such as the S-shape illustrated in FIGURE 4. A mid-portion of this spring may, if desired, be secured to the rear flange 19 as by a clip 58 secured to the rear flange. An upper end 59 of the positioning spring is received in a hole in the latch 39 and a lower end 60 of the positioning spring is received in a hole in the trigger body 46 for urging the latch 39 to its released position and the trigger 45 to its cocked position. In FIGURE 6 a slightly modified positioning spring 57' is similarly associated with the latch 39 and the trigger 45, and herein primed reference numerals indicate similar parts. Therefore, the holding portion flange 49 of the trigger is positioned to engage and ride over the inclined surface 50 and into the trigger holding notch 51 of latch 39 as the bail 14 is moved into its cocked position in the bail receiving notch 42 of latch 39.

As previously discussed, hood 11 is detachably secured to the frame 10. An open bottom of the hood is adapted to be positioned over the opening 12 to an animal's hole, and an open side communicates with the opening 29 in the front flange 18 of frame 10. An arcuate top 61 and depending sides 62 form an enclosure for directing an animal leaving hole opening 12 through the front flange opening 29 and onto the trigger pressure plate 53, thereby releasing the trap and killing the animal. Hood 11 is detachably secured to the trap frame 10 by a pair of spaced L-shaped pins 63 extending through holes in the front flange 18 so that the hood may be pivoted against the outer face of the front flange whereupon lower edges of hood sides 62 are pressed inwardly for engagement of outwardly opening notches in the sides with headed pins 64 on front flange 18.

To protect larger animals such as dogs and cats from treading on the trigger pressure plate 53, and to protect bait 54 from weather, the cover 15 may be secured over the open top of the trap frame 10 by a pair of depending flanges 65 extending downwardly from a top plate 66 of the cover 15 and resiliently engaging outer faces of the front and rear flanges 18 and 19. Extending downwardly and outwardly from the sides of the cover top 66 are side aprons 67 which are spaced from and partially cover the open sides of the frame 10 so that only the smaller animals for which the trap is intended may contact the trigger pressure plate 53.

The trap may, of course, be used with or without the hood 11 and cover 15. The opening 29 and front flange 18 may be positioned against an animal opening in a wall so that the animal could not avoid the trigger pressure plate 53 when entering or leaving the opening.

The foregoing detailed description has been given for clearness of understanding only, and no unnecessary limitations should be understood therefrom for some modifications will be obvious to those skilled in the art.

I claim:

1. An animal trap comprising: a U-shaped rigid sheet metal frame having a bottom base, opposed upstanding relatively high front and rear walls at opposite edges of the base, said front wall having a large opening at its lower extremity and spaced above said base, and opposed relatively low side flanges connecting said walls at opposite side edges of the base and cooperating with said walls for effectively excluding foreign matter from within said frame; a bail pivoted at the juncture of said base and rear wall for swinging movement within said frame between an upright position along said rear wall and a trapping position along said base; spring means urging said bail toward trapping position; an upstanding latch member pivoted near the top of said rear wall, said latch member having an upwardly opening slot inwardly of said pivot for receiving and releasably retaining said bail in upright position; means including a cam portion on said latch member terminating at said slot and cooperating with said bail upon movement of the bail toward upright position for pivoting said latch member to receive said bail in said slot; means including another cam portion on said latch member defining an edge along said slot and cooperating with said bail as said bail is received in said slot to pivot said latch member for releasably holding said bail in said slot; a trigger having a pressure pad overlying said base and freely pivoted at the juncture of said base and rear wall for pivotal movement of said pad toward and away from said base; cooperating latch means on a lower portion of said latch member and on said trigger and when engaged releasably holding said latch member in bail retaining position; and means including an additional cam portion on said latch member cooperating with said trigger to engage said latch means as said latch member moves into bail retaining position.

2. The animal trap of claim 1 and resilient means mounted on said frame and urging said latch member to position for releasing said bail and said trigger to position for latched engagement with said latch member and said pressure pad away from said base.

3. The trap of claim 1 and a cocking lever having a hinge pin pivoted on said frame generally parallel the juncture of said base and rear wall and freely pivotally mounting said bail and trigger on said frame and mounting said spring means, a finger on said cocking lever freely engaging said bail for moving said bail to upright position, a handle on said cocking lever outside said frame for moving said finger to position said bail in upright position, whereby said cocking lever may be freely pivoted away from said bail in upright position so that the handle remains stationary as the bail snaps to trapping position.

4. An animal trap as specified in claim 1, wherein a cover is detachably secured to and extends between said front and rear walls, said cover having aprons extending downwardly and outwardly from said sides for detering larger animals from contacting said trigger and for protecting bait in the trap.

References Cited in the file of this patent

UNITED STATES PATENTS

| | | |
|---|---|---|
| 665,907 | Hooker | Jan. 15, 1901 |
| 1,275,993 | Spangler | Aug. 13, 1918 |
| 1,802,272 | Rice | Apr. 21, 1931 |
| 1,851,371 | Northup | Mar. 29, 1932 |
| 2,416,481 | Hollenbeck | Feb. 25, 1947 |
| 2,428,721 | Peterson | Oct. 7, 1947 |
| 2,511,519 | Van Brunt | June 13, 1950 |

FOREIGN PATENTS

| | | |
|---|---|---|
| 128,147 | Great Britain | June 19, 1919 |
| 309,895 | Italy | July 19, 1933 |